United States Patent [19]
Van Gundy, Sr.

[11] Patent Number: 5,284,214
[45] Date of Patent: Feb. 8, 1994

[54] DRILL PIPE COUPLING APPARATUS

[76] Inventor: Joseph F. Van Gundy, Sr., 203 Sears Ct., Plano, Ill. 60545

[21] Appl. No.: 950,709

[22] Filed: Sep. 25, 1992

[51] Int. Cl.$^5$ ............................................. E21B 17/00
[52] U.S. Cl. ..................................... 175/320; 285/140
[58] Field of Search ....................... 175/320, 321, 324; 166/378, 380, 381; 285/138-140

[56] References Cited

U.S. PATENT DOCUMENTS

| | | |
|---|---|---|
| 221,153 | 11/1879 | Chapin . |
| 1,658,264 | 3/1926 | Sutton et al. . |
| 4,199,033 | 4/1980 | Van Gundy, Jr. . |
| 4,378,057 | 3/1983 | O'Connell ......................... 175/320 X |
| 4,423,778 | 1/1984 | Goldsmith ........................ 175/320 X |
| 4,615,545 | 10/1986 | Cruse ................................ 285/138 X |
| 5,050,691 | 9/1991 | Moses .............................. 175/320 X |
| 5,125,148 | 6/1992 | Krasnov ........................... 285/140 X |

FOREIGN PATENT DOCUMENTS

1030984  5/1966  United Kingdom .

*Primary Examiner*—Thuy M. Bui
*Attorney, Agent, or Firm*—Kalish & Gilster

[57] ABSTRACT

The pipe coupling in accordance with the present invention broadly includes an elongated female member having structure defining a bore spanning the length thereof, a first hollow elongated male member having an end portion non-rotatably affixed within a portion of the bore, a second elongated male member slidably engagable within the remaining portion of the bore, a lock pin slidably engagable through aligned apertures in the female and second male members, and a pliable gasket for placement between the first and second male members. The second male member also includes structure defining a passage spanning its length and presenting an inlet and an outlet wherein the passage diverges into two passages on the inlet side of the aperture and converges back into one passage on the outlet side of the aperture. Preferably, the matable ends of the first and second male members are concave and convex, respectively, which cooperate to compress the gasket to provide a fluid-tight seal between the male members when the second male member is locked into the female member.

9 Claims, 2 Drawing Sheets

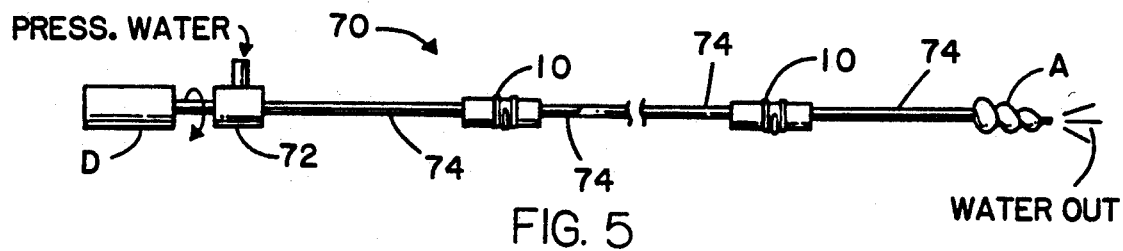
FIG. 5
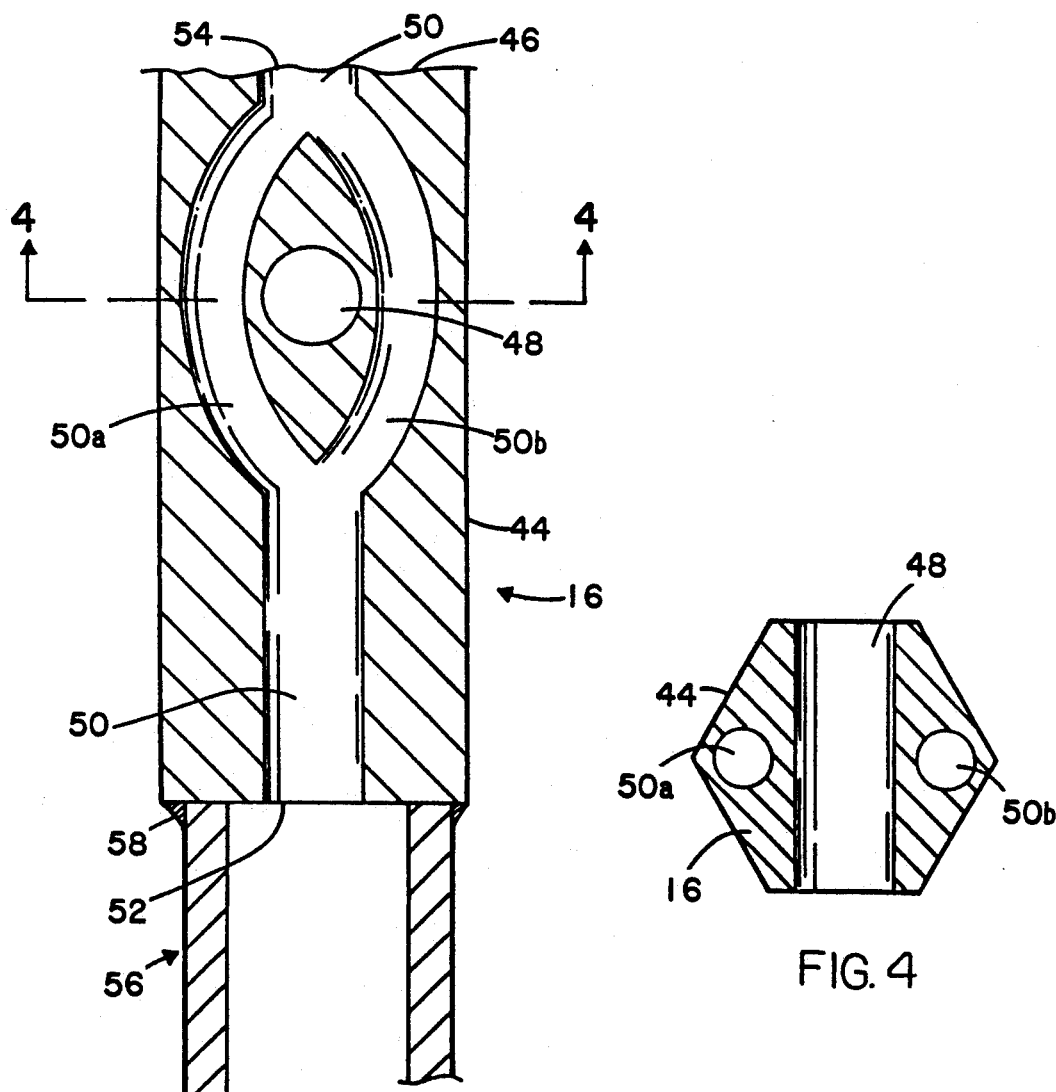
FIG. 3
FIG. 4

DRILL PIPE COUPLING APPARATUS

BACKGROUND OF THE INVENTION

1. Field of the Invention

This invention relates to an improved drill pipe coupling of simple yet highly effective construction which has numerous advantages including ease of attachment/detachment of hollow pipe sections, watertightness, and secure attachment of hollow multiple pipe sections regardless of direction of pipe rotation. More particularly, it is concerned with a pipe coupling having a male/female connection which prevents rotation of hollow separate pipe sections with respect to each other, with means for preventing the connection from being pulled apart, and means for water tight sealing of the coupling and pipe section for water flowing within the pipe sections and the coupling at high pressure.

2. Description of the Prior Art

When drilling or boring through earth it is often necessary to couple multiple lengths of pipe together in order to drill the required length as by using a drilling or augering accessory of the type disclosed in Van Gundy U.S. Pat. No. 4,197,033. Often pressurized water is introduced at one end of such a pipe string and is exited at the tip of an auger at the other end. This pressurized water irrigates the flighted auger and actually helps breakup the earth to be excavated which helps prevent the need to back the auger out and redrill. It is possible for the water pressure in this type of drilling to reach or exceed pressures of 3000 psi. As can easily be understood, any water leakage at the pipe couplings will result in loss of pressure at the auger tip which in turn reduces the effectiveness of the drilling operation.

The longitudinal and rotational coupling of drill pipe is well known. It is known to use various pins and interlocking configurations to prevent the separation of coupled pipe sections. For example, Davis British Patent No. 1,030,984, discloses an elongated box having a longitudinal bore which is irregular in cross sectional shape and a communicating end portion of which is circular in cross section and a mating elongated tubular pin, the external size and cross sectional configuration of which is complemental to the size and cross sectional configuration of the bore in the box. The pin thus slidably but nonrotatably fits into both the above mentioned bore portions of the box. There is an annular external keeper groove encircling the pin intermediate its ends, an aperture extending transversely through the wall of the box at a location to align with the groove when the pin and box are mated, and a removable keeper insertable into the aligned aperture and groove to lock the pin and box against longitudinal separation. A conventional O-ring sealing member seals against the wall of the circular cross section bore portion of the box when the pin and box are mated.

There is no discussion in the Davis patent of any flow through the coupled drill pipe. Though the hollow construction might be presumed to allow such flow, there is no indication that such a coupling would provide a water tight seal at the pressures contemplated by the present invention.

A sucker rod coupling is disclosed by Sutton et al U.S. Pat. No. 1,658,264. The coupling disclosed in this patent has structure providing for a pin to couple two parts, each connected to corresponding rods. There is no disclosure for accommodating water flow therein as in the present invention.

A pipe and hose coupling is disclosed by Chapin U.S. Pat. No. 221,153. The patent discloses a U-shaped locking-key that enters recesses of mated male and female portions and is retained by side caps of the female portion. Again, there is no indication that a water tight seal is provided at the required pressures.

A number of coupling arrangements have been proposed in the past for drill pipe strings. In general however, these coupling schemes have not met the need for providing a reliable, yet water tight coupling of pipe sections at the required pressures.

SUMMARY OF THE INVENTION

The problem outlined above is in large measure solved by the drill pipe coupling in accordance with the present invention. That is to say, the coupling hereof provides for ease, convenience and speed of attachment/detachment of pipe sections, watertightness, and secure attachment of multiple pipe sections regardless of direction of stress applied to the coupled pipe string.

Accordingly, among the objects of the invention may be noted the provision of an improved pipe coupling, namely a pipe coupling for coupling together drill strings components for rotational driving relationship in either direction of rotation; which coupling permits flow of irrigant fluid, namely high pressure water, therethrough as for irrigated augering by the drill string; which assures of highly fluid-type coupling from the component to another which provides compressed, reliable resilient sealing when coupled; which is highly resistant to being decoupled and thus extremely reliable when the drill string is exposed to longitudinal shifting, drill forces, insertion forces, removal forces, and changes in rotation direction; which permits water flow therethrough, during drilling, at pressures up to 3000 psi or greater; and which is not only economic but tough and durable in long-term, repeated commercial use.

It is a further object of the invention to provide such a coupling with through-pin coupling of reliable, easily-coupled and -decoupled nature which greatly minimized flow use and pressure drop through the coupling by utilizing multiple bypass channels minimizing flow restriction in a novel and highly effective manner.

The pipe coupling in accordance with the present invention broadly includes an elongated central coupling member having structure defining a bore spanning the length thereof, a first hollow elongated member having an end portion non-rotatably affixed within a portion of the bore, a second elongated male member slidably engagable within the remaining portion of the bore, a lock pin slidably engagable through aligned apertures in the central and second male members, and a pliable pressure-deformable gasket for placement between the first and second male members. The second male member also includes structure defining a passage spanning its length and presenting an inlet and an outlet wherein the passage diverges into multiple passages on the bypass inlet side of the aperture. These bypass passages converge back into one passage on the outlet side of the aperture. The matable ends of the first and second male members are concave and convex, respectively, and cooperate to compress the gasket to provide a fluid-tight seal between the male members when the second male member is locked into the central member by the locking pin.

The coupling provides for coupling of drill string components for rotational driving relationship in either direction of rotation, i.e., either clockwise or counterclockwise about the axis of rotation, as for selectively reversing the drill string direction of rotation.

Other objects and features will be apparent or pointed out in the following description.

BRIEF DESCRIPTION OF THE DRAWINGS

FIG. 3 is a sectional view of the second male member which illustrates the divergent paths around the aperture; and FIG. 4 is a sectional view taken along line 4—4 of FIG. 3.

FIG. 5 is a schematic illustration of a drill string apparatus employing the new coupling and illustrating use.

Corresponding reference numerals indicated corresponding parts among the several drawing figures.

DETAILED DESCRIPTION OF THE PREFERRED EMBODIMENT

Figures 1, 2:
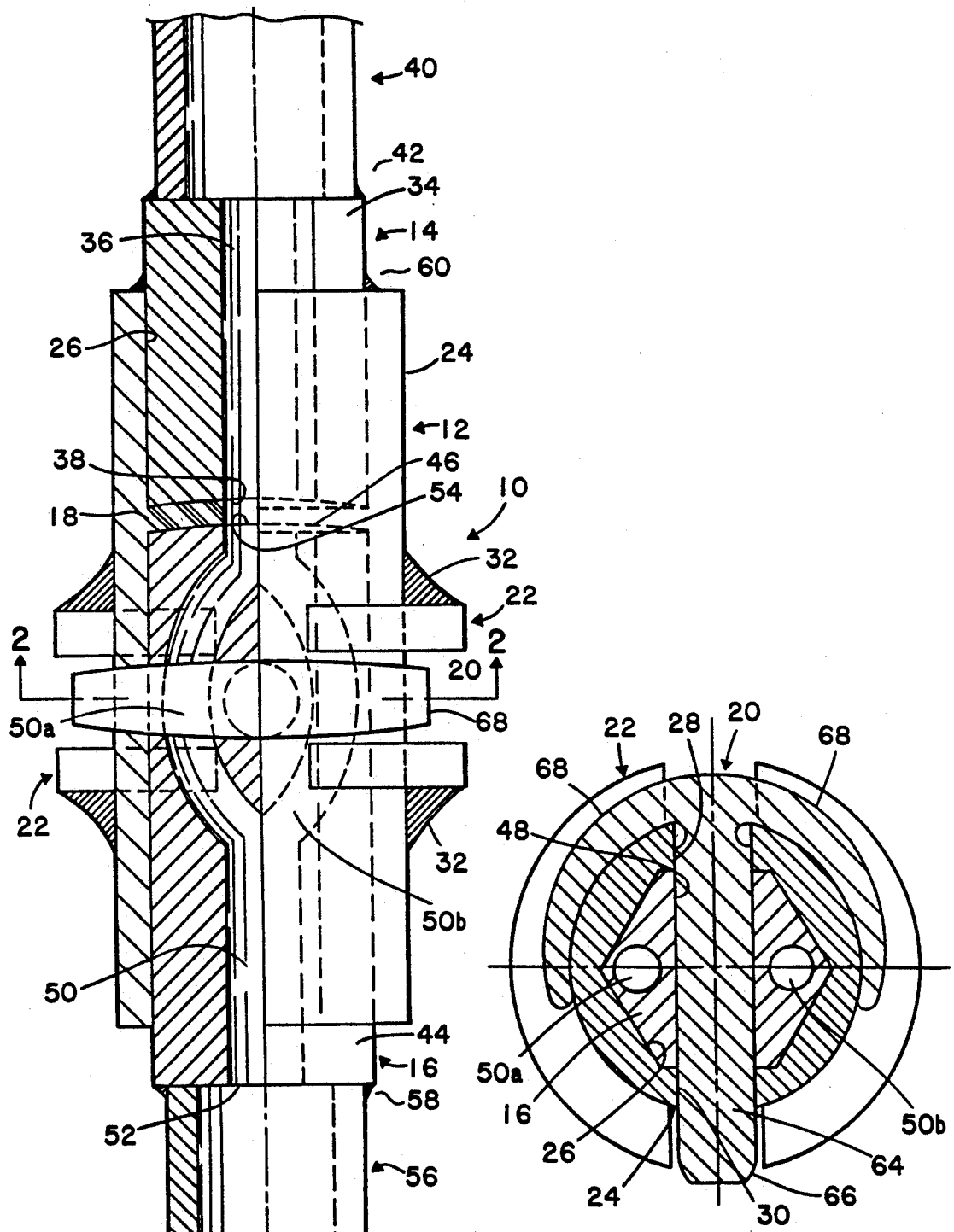
FIG. 1 is a partial sectional view of the preferred drill pipe coupling in accordance with the present invention.
FIG. 2 is a sectional view taken along line 2—2 of FIG. 1.

Referring now to the drawing, a drill pipe coupling apparatus 10 in accordance with the invention broadly includes a central, female member 12 wherein male coupling members 14 and 16 are held, a flexible gasket 18 (preferably formed of neoprene) positioned between members 14 and 16, and a lock pin 20. Apparatus 10 also preferable includes arcuate guards 22 to prevent lock pin 20 from being dislodged during rotation of the pipe string.

In more detail, elongated member 12 presents a generally cylindrical outer surface 24 and structure forming a bore 26 spanning the length of member 12. Bore 26 has a cross-sectional shape other than circular, such as the preferred hexagonal configuration shown in FIG. 2, to prevent members 14 and 16 from rotating relative to member 12. Member 12 further includes structure forming through-holes in the form of circular apertures 28 and 30, as shown in FIG. 2, wherein hole 28 is approximately 180 degrees from hole 30 on outer surface 24. Additionally, arcuate guards 22 are attached by weld joints 32 to outer surface 24 adjacent holes 28 and 30, as shown in FIG. 1.

Member 14 is elongated. It presents an outer surface 34 with a cross sectional shape complimentary to bore 26 and structure defining a passage 36 spanning the length thereof. The matable end of member 14 presents a generally concave face 38 and the opposite end is attached to one end of a drill pipe 40 weld joint 42, such that passage 36 communicates with the interior of drill pipe 40.

Elongated member 16 presents an outer surface 44 with a cross sectional shape essentially the same as member 14. The matable end of member 16 presents a generally convex face 46, preferably with a radius of curvature slightly less than that of face 38. Structure of member 12 defines a generally cylindrical aperture 48 transverse of member 16 and intermediate its ends. For water flow therethrough, member 16 has structure defining a passage 50 spanning the length thereof and presenting an inlet 52 and an outlet 54 at respective ends of member 16. Passage 50 smoothly divides into divergent multiple bypass passages 50a and 50b, as shown in FIGS. 3 and 4. Passages 50a and 50b then smoothly converge on the outlet 54 side of aperture 48 to reform single passage 50, thereby bypassing aperture 48. Said bypass passages 50a and 50b are each of nearly semicircular, essentially lenticular shape (in horizontal section as shown) but transversely are of circular cross section. The bypass pathways on opposite sides of the lock pin are thus conductive to essentially laminar flow as well as high volumetric flow. The smoothly, accuately divergent-convergent-lenticular flow avoids sharp pathway bends which would be flow-disruptive and drag producing.

A drill pipe 56 is attached to the inlet end of member 16 by weld joint 58 so that inlet 52 is in communication with the interior of drill pipe 56. Preferably, member 16 is formed of cast steel.

For providing a drill section, the matable end of member 14 is placed within bore 26 and permanently attached to member 12 by weld joint 60, as shown in FIG. 1. In use, and to couple one section to the next in configuration, gasket 18, which has a cross sectional shape and size essentially the same as members 14 and 16, is placed within bore 16. Gasket 18 includes a centrally located opening (not shown) which corresponds to passages 36 and 50.

The convex end of member 16 is then slid within bore 26 until aperture 48 begins to align with holes 28 and 30. Full in register alignment is resisted as face 46 is urged against gasket 18. At this point a lock pin 20 is pushed through the aligned aperture 48 and holes 28 and 30. Lock pin 20 has a generally cylindrical body 64 which snugly fits within the aperture 48 and holes 28 and 30. One end of pin 20 has structure defining a taper 66, which facilitates insertion into member 16 and member 12 and allows compression of gasket 18 by face 46. I.e., the tapered nose effectively cams face into tight sealing relation with gasket 18. The other end of pin 20 is attached to resilient arcuate member 68, which has a curvature generally the same as that of outer surface 24 so that arcuate member 68 acts to hold lock pin 20 which within the aligned holes and aperture by gripping onto outer surface 24. Advantageously, arcuate member 68 lies between arcuate guards 22 which greatly reduces the chances of dirt, rocks or the like from dislodging lock pin 20 during drilling operations, as when there is not only longitudinal movement but also possibly change in direction of axial rotation.

When lock pin 20 has coupled member 16 within member 12, convex face 46 and concave face 38 thereby cooperate to partially compress gasket 18 thereby forming a watertight seal which can withstand pressures of up to 3000 psi for example. The relative longitudinal placement of aperture 48 is such that when pin 20 is pushed into locking position, face 46 is driven into gasket 18 for partial compression thereof, as maintained by the pin. Once the watertight seal is formed pressurized water is introduced into pipe 56 which flows through passages 50, 50a, 50b, 36, and pipe 40 and is finally exited through the auger tip (FIG. 5) at the leading end of a coupled pipe string.

Referring to FIG. 5, use of the coupling in a drill string 70 is shown, being configured as driven horizontally by a hydraulic drive D. An associated journal 72 to which water can be supplied at high pressure, representatively to reach or even exceed 3000 psi, being depicted in horizontal configuration as for boring in earth. String 70 may stretch for substantial distances, e.g. to 100 ft. or more according to the member of coupling pipe lengths 74, each pair joined being by a coupling 10. At the outer end of string 70, a flighted auger A is shown, having at its tip suitable openings for discharge of water in known manner for irrigated augering. Drive D may reverse the selected clockwise or counterclockwise direction of rotation, as for bricking the auger from an obstruction or a bind. Coupling 10 assures that the drill string can be rotated in either direction, without objectional leakage. The coupling design minimizes fluid flow obstruction even if the drill string may be of great length. The new coupling assures that the drill string will remain intact, but without objectionable loss of water at the couplings, and without the flow being exposed to objectional pressure drops at the couplings, as thus achieved by the novel bypass arrangement providing smooth bypassing without restriction. In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A drill pipe coupling apparatus for coupling of drill string components for rotational driving relationship in either direction of rotation, comprising:

an elongated female member having structure defining a bore spanning the length thereof, said bore having a cross-sectional shape other than circular;

a first hollow elongated male member having an end portion with a cross-sectional shape complimentary to said bore wherein said end portion is non-rotatably affixed within a portion of said bore;

a second elongated male member having an end portion with a cross-sectional shape complimentary to said bore wherein said second male member is slidably engagable within remainder of said bore such that said second male member is non-rotatable with respect to said female member, said second male member presenting opposing ends and having structure defining an aperture intermediate of said opposed ends wherein said aperture presents a cross-sectional shape, said female member having structure defining first and second holes corresponding in cross-sectional shape to said aperture, said first and second holes being positioned such that said aperture aligns with said first and second holes when said second male member is within said female member thereby creating an opening which extends through said female and second male members, said second male member further including structure defining a passage spanning the length thereof presenting an inlet and outlet at each end thereof wherein said passage diverges on said inlet side of said aperture there by defining multiple passages around said aperture, said multiple passages converging on said outlet side of said aperture thereby reforming a single passage;

lock pin means slidably engagable through said aligned aperture and holes for locking said second male member within said female member; and gasket means for providing a fluid-tight seal between said first and second male members.

2. Coupling apparatus as set forth in claim 1, wherein said bore and first and second male member cross-sectional shapes are hexagonal.

3. Coupling apparatus as set forth in claim 1, wherein said first and second male members each present end most sections, said first end most section presenting a generally concave face and said second end most section presenting a generally convex face wherein said convex face cooperates with said concave face within said female member to at least partially compress said gasket means when said second male member is locked into said female member thereby forming said fluid-tight seal.

4. Coupling apparatus as set forth in claim 3, said fluid-tight seal being capable of withstanding pressures up to 3000 pounds per square inch.

5. Coupling apparatus as set forth in claim 4, wherein said gasket means is formed of neoprene.

6. Coupling apparatus as set forth in claim 1, wherein said female member presents a generally cylindrical outer surface, said lock pin means further including:

a generally cylindrical body presenting first and second opposing ends wherein said second opposed end is tapered for facilitating insertion through said holes and aperture; and a resilient arcuate member presenting first and second ends, wherein said first arcuate end is fixedly attached to said first pin end and said second arcuate end faces said pin body for gripping said outer surface thereby holding said lock pin within said holes and apertures.

7. Coupling apparatus as set forth in claim 6, wherein guard means are attached to said outer surface adjacent each side of said lock pin means for protecting against accidental dislodgement of said look pin means during rotation of coupled pipe segments.

8. Coupling apparatus as set forth in claim 7 wherein the guard means comprises at least a pair of radical projections extending at least partly around the outer surface of the elongated female member in longitudinally spaced relation with a portion of the lock pin therebetween in protected relationship.

9. For coupling together hollow drill pipe sections of a drill string for coupling of drill string components for rotational driving relationship in either direction of rotation, the drill string components permitting axial fluid flow therethrough for irrigated drilling by flow of irrigant fluid therethrough a drill coupling having opposite ends each for receiving the outer end of a respective drill section, means permanently affixing one end of the coupling to one end of the drill pipe sections, key means for selectively coupling the coupling to the other of the drill sections, the key means including a key and keyway extending transversely centrally through the coupling, the coupling providing liquid flow communication from a bore of one drill pipe section to the other drill pipe section, including multiple bypass channels for liquid flow bypassing of the keyway.

* * * * *

UNITED STATES PATENT AND TRADEMARK OFFICE
CERTIFICATE OF CORRECTION

PATENT NO. : 5,284,214

DATED : Feb. 8, 1994

INVENTOR(S) : Joseph F. Van Gundy, Sr.

It is certified that error appears in the above-identified patent and that said Letters Patent is hereby corrected as shown below:

Column 6, line 42, delete "look" and insert --lock--.

Signed and Sealed this

Twelfth Day of July, 1994

*Attest:*

BRUCE LEHMAN

*Attesting Officer*     *Commissioner of Patents and Trademarks*